(12) United States Patent
Ermilov et al.

(10) Patent No.: US 6,261,002 B1
(45) Date of Patent: Jul. 17, 2001

(54) GAS DYNAMIC FOIL BEARING

(75) Inventors: Yuri I. Ermilov; Yuri A. Ravikovich, both of Moscow (RU)

(73) Assignee: Samsung Aerospace Industries, Ltd., Kyongsangnam-Do (KR)

( * ) Notice: Subject to any disclaimer, the term of this patent is extended or adjusted under 35 U.S.C. 154(b) by 0 days.

(21) Appl. No.: 09/402,107
(22) PCT Filed: Oct. 23, 1997
(86) PCT No.: PCT/KR97/00200
  § 371 Date: Mar. 15, 2000
  § 102(e) Date: Mar. 15, 2000
(87) PCT Pub. No.: WO98/48183
  PCT Pub. Date: Oct. 29, 1998

(30) Foreign Application Priority Data

Apr. 3, 1997 (RU) .................................................. 97105252

(51) Int. Cl.[7] .................................................. F16C 32/06
(52) U.S. Cl. ................................................ 384/105; 384/106
(58) Field of Search ................................ 384/103, 105, 384/106

(56) References Cited

U.S. PATENT DOCUMENTS

| | | | |
|---|---|---|---|
| 3,893,733 | 7/1975 | Silver et al. | 384/106 |
| 4,451,163 | * 5/1984 | Glaser | 384/106 |
| 4,475,824 | * 10/1984 | Glaser et al. | 384/106 |
| 5,498,082 | 3/1996 | Nadjafi | 384/105 |
| 5,498,083 | 3/1996 | Brown | 384/106 |
| 5,634,723 | * 6/1997 | Agarawal | 384/106 |

FOREIGN PATENT DOCUMENTS

| | | |
|---|---|---|
| 1754949 | 11/1990 | (SU) . |
| 92/10689 | 6/1992 | (WO) . |

* cited by examiner

*Primary Examiner*—Thomas R. Hannon
(74) *Attorney, Agent, or Firm*—Finnegan, Henderson, Farabow, Garrett, & Dunner, L.L.P.

(57) ABSTRACT

A gas dynamic foil bearing comprises a plate (13) attached to a base (10), support members (14) fixed on the plate (13) at predetermined intervals, elastic foils (15) fixed to the support members (14) at one end thereof to overlap each other, a thrust disk (11) connected to a rotating rotor and placed on the elastic foils (15), and bent springs (17) interposed between the elastic foils (15) and the plate (13) in the overlapping area of the elastic foils (15) for supporting the elastic foils (15).

13 Claims, 7 Drawing Sheets

GAS DYNAMIC FOIL BEARING

TECHNICAL FIELD

The present invention relates to bearings, and more particularly, to gas dynamic foil bearings with gas lubrication, used for axial and radial suspension of rotors which rotate at a high speed in a turbomechanism such as a turbocooler, a turboexpander, a turbocompressor, a turbocharger, a turbogenerator, and a turbopump.

BACKGROUND ART

A gas dynamic foil bearing is simple in its structure and can be produced economically. Therefore, it has been widely applied to small-sized machines. In U.S. Pat. No. 3,893,733, issued on Jul. 8, 1975, entitled "Foil Bearing Arrangements" to Silver et al., a self-pressurizing hydrodynamic foil bearing is described in which the foil bearing comprises resilient foils providing support between a movable and stationary bearing member and resilient foil supports for supporting and stiffening the foils.

A conventional thrust gas foil bearing disclosed in Soviet Union Patent No. 1754949, issued on Aug. 15, 1992, is illustrated in FIG. 1. As shown in FIG. 1, the thrust gas foil bearing includes a plate 1 attached to a base 10, support members 2 fixed on the plate 1 by welding, and elastic foils 3 attached to the supporting members 2 by welding such that the elastic foils 3 overlap as shown. Here, the elastic foil 3 has a support portion 3a which is a tail thereof and is not attached to the support member 2, and an edge 3b of the elastic foil 3 is in contact with the adjacent foil 3. The radius of curvature of the elastic foil 3 decreases from R1 to R2 toward the edge 3b. Also, a thrust disk 11 connected to a rotor (not shown), for example, a rotating shaft is placed on the elastic foils 3.

As the thrust disk 11 connected to the rotor rotates, the gas is drawn into the space between the thrust disk 11 and the elastic foils 3, thereby lifting the thrust disk 11 from the elastic foils 3. Here, the thrust disk 11 remains in contact with the elastic foils 3 until the speed of rotation thereof reaches a normal lift-off speed. At this time, the elastic foil 3 is pressed downward by the edge 3b of the adjacent foil 3 and is elastically deformed to thereby contact the upper surface of the plate 1 at the position A (FIG. 2). At the same time, the lower surface of the deformed foil 3 is in contact with and is elastically supported by the support portion 3a of the adjacent foil 3 at position B.

However, the conventional thrust gas foil bearing has several shortcomings. Since the support portion 3b supporting the adjacent elastic foil 3 is integrally formed with the elastic foil 3 of the same material, it cannot additionally provide sufficient rigidity to each foil 3 elastically deformed by the axial load. Accordingly, the elastic foil 3 is deformed downward until it contacts the upper surface of the plate 1, which causes an axial displacement of the thrust disk 11 or the rotor connected thereto to increase during the initial operation of the bearing.

Also, the damping capacity against the axial load and a bearing load capacity are poor because the elastic foils 3 contact the plate 1 during operation at normal lift-off speed. Further, the elastic foil 3 has a radius that gradually gets smaller toward the edge 3b, thereby making the manufacturing process thereof complicated and difficult.

DISCLOSURE OF THE INVENTION

It is an object of the present invention to provide a gas dynamic foil bearing which decreases the displacement of the thrust disk or axis during the initial operation, increases the bearing load capacity, and simplifies the manufacture thereof.

According to an embodiment of the present invention, there is provided a gas dynamic foil bearing comprising a plate attached to a base, support members fixed on the plate by a predetermined distance, elastic foils fixed to the support members at one end thereof to overlap each other, and a thrust disk connected to a rotating rotor and placed on the elastic foils, characterized by comprising bent springs interposed between the elastic foils and the plate in the overlapping area of the elastic foils for supporting the elastic foils.

The elastic foil has the same curvature through its overall length and the bent spring is comprised of a working portion which supports the elastic foil and is elastically deformed, and coupling portions, at one side or both sides thereof, connected to the plate at the position off a bearing operating zone being between the internal radius and the external radius of the elastic foil.

Alternatively, the bent spring rests on a groove formed in a positioning plate connected on the plate and prevented from falling out of the groove by the elastic foils.

According to another embodiment of the present invention, there is provided a gas dynamic foil bearing comprising a plate attached to an inner circumferential surface of a base, support members fixed on the plate by a predetermined distance, elastic foils fixed to the support members at one end thereof to overlap each other, and a rotation axis contacting the elastic foils, characterized by comprising bent springs interposed between the elastic foils and the plate in the overlapping area of the elastic foils for supporting the elastic foils.

According to the present invention, the rigidity of the elastic foil package is determined by the rigidity of the elastic foils during the initial operation, and by the rigidity of the bent spring during normal lift-off operation.

BEST MODE FOR CARRYING OUT THE INVENTION

A gas dynamic foil bearing of the present invention can be applied to either thrust bearings or radial bearings.

Figure 3:
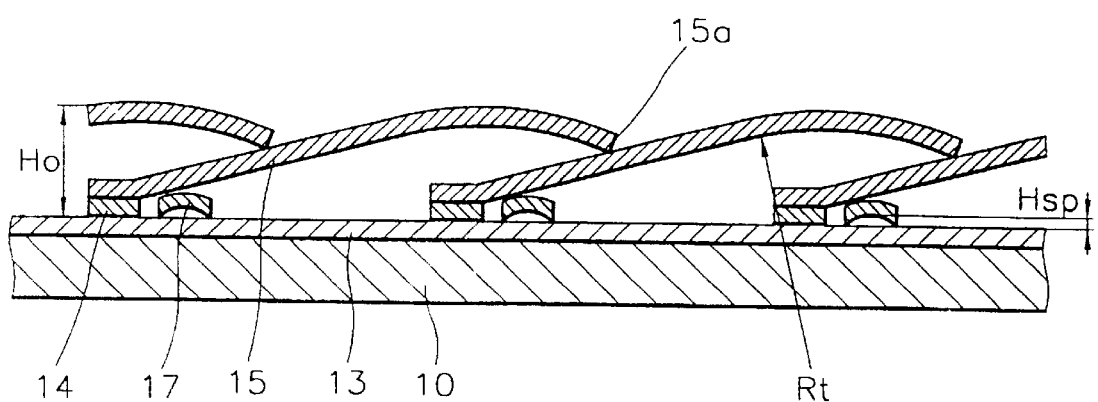
FIGS. 3 and 4 are sectional views of a thrust gas dynamic foil bearing according to an embodiment of the present invention.
Figure 4:
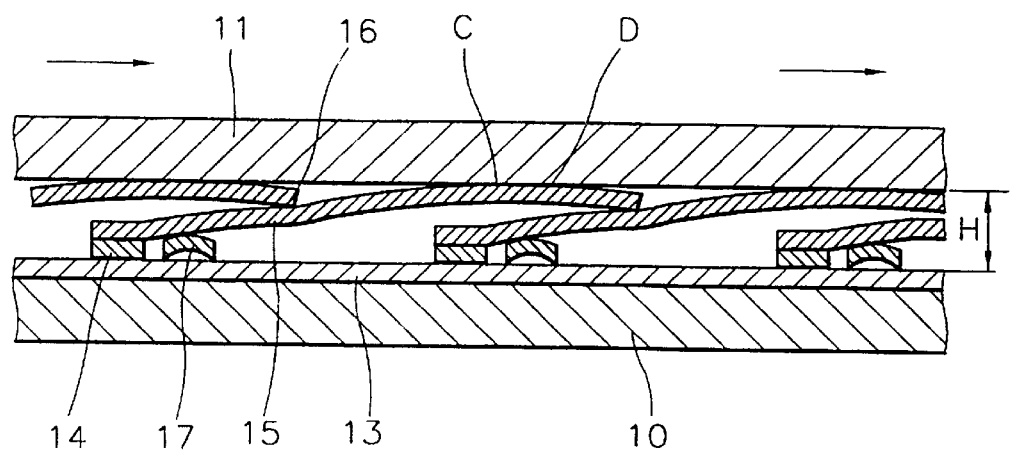

A preferred embodiment of a thrust gas dynamic foil bearing according to the present invention is shown in FIGS. 3 and 4. Referring to the drawings, the gas dynamic foil bearing comprises a plate 13 attached to a base 10 and having support members 14 rigidly fixed thereon at predetermined intervals, for example by welding and gluing or formed by etching or plate deformation, and elastic foils 15 fixed on the support members 14 of the plate 13 at one end thereof by welding also. Here, the elastic foils 15 overlap each other and the edge 16 of each elastic foil 15 rests on the upper surface of the neighboring elastic foil 15.

Figure 5:
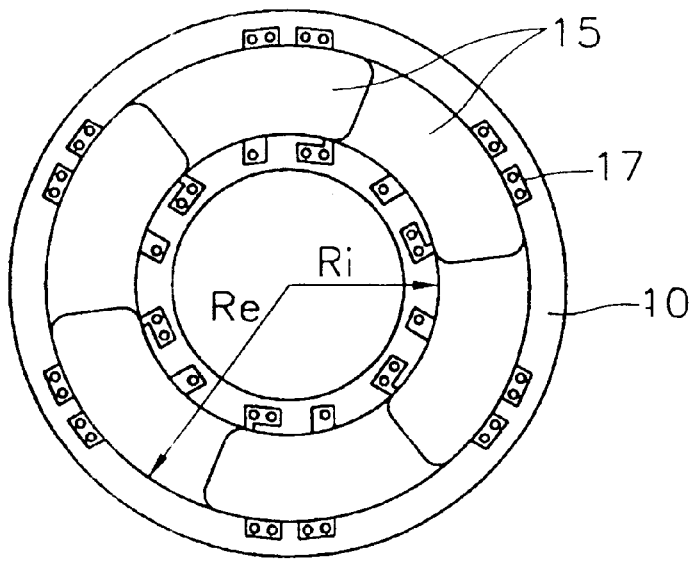
FIG. 5 is a plan view of the thrust gas dynamic foil bearing shown in FIG. 4.
Figure 6:
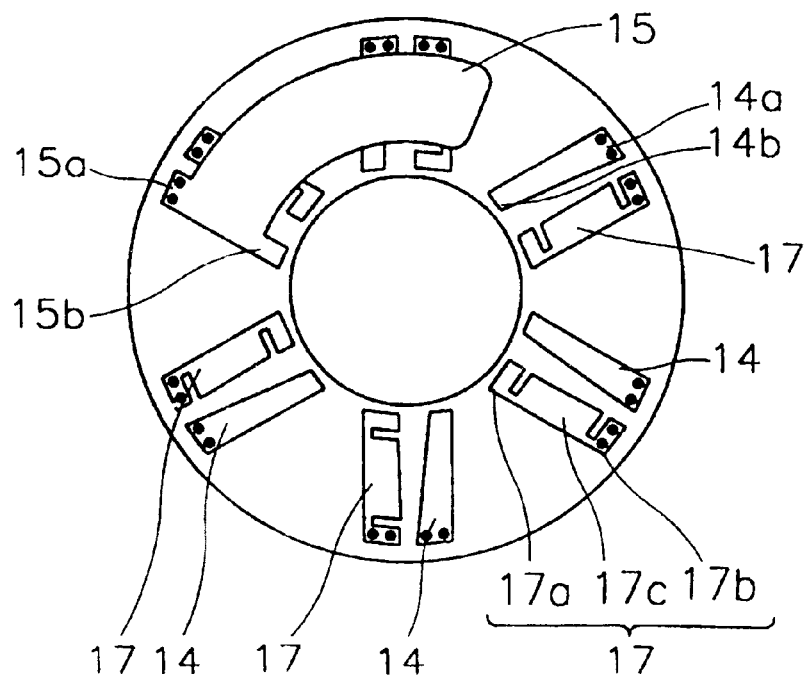
FIG. 6 is a plan view, similar to FIG. 5, showing the connection of support members and bent springs.

Preferably, as shown in FIGS. 5 and 6, the connection between the end of the elastic foil 15 and the support member 14 (see FIG. 4) and between the plate 13 and the support member 14 is performed at a position 14a and 14b off a bearing operating zone being between the internal radius Ri and the external radius Re of the elastic foil 15. At this time. the support member 14 and the elastic foil 15 are welded, preferably, at the position 14a and 15a toward the external radius of the plate 13, or at both positions 14a and 14b, and 15a and 15b, respectively. Also, the elastic foil 15 may have a width that gradually gets smaller from the fixed portion thereof toward the edge 16.

According to the characteristic of the present invention, an arc-shaped bent spring 17 for supporting the elastic foil 15 is interposed between the elastic foil 15 and the plate 13 in the overlapping area of the elastic foils 15. The bent spring 17 has a rigidity greater than that of the elastic foil 15.

Referring to FIG. 6, the bent spring 17 is comprised of a working portion 17c which supports the elastic foil 15 and is elastically deformed, and a coupling portions 17a and 17b at both sides thereof. The bent spring is mounted on the plate 13 by welding the coupling portions 17a and 17b thereof to the plate 13 at a position off the aforementioned bearing operating zone. At this time, the bent spring 17 is welded, preferably, at the position 17b toward the external radius of the plate 13, or at both positions 17a and 17b.

Figure 7:
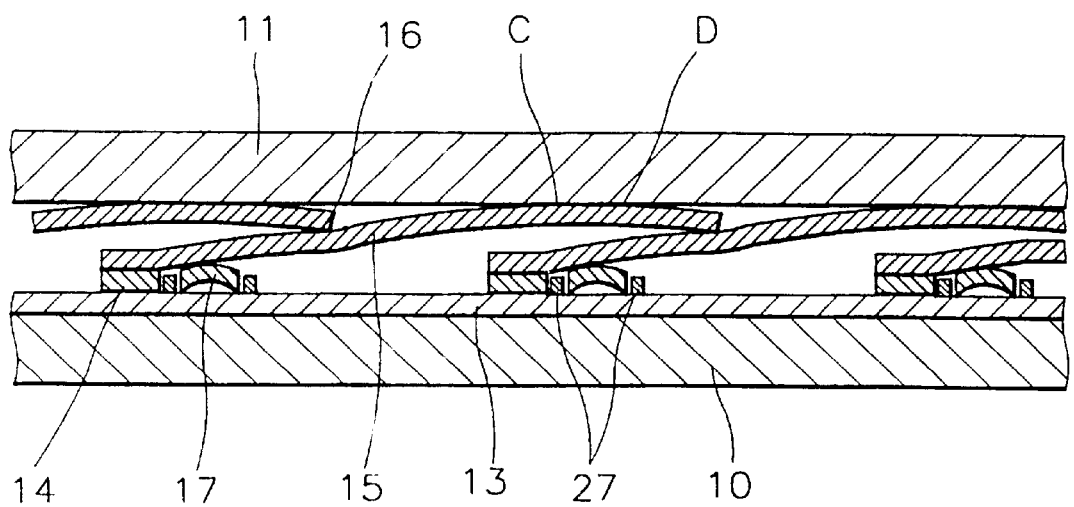
FIG. 7 is a sectional view showing another example of the connection of the bent springs in the thrust gas dynamic foil bearing in FIG. 4.
Figure 9:
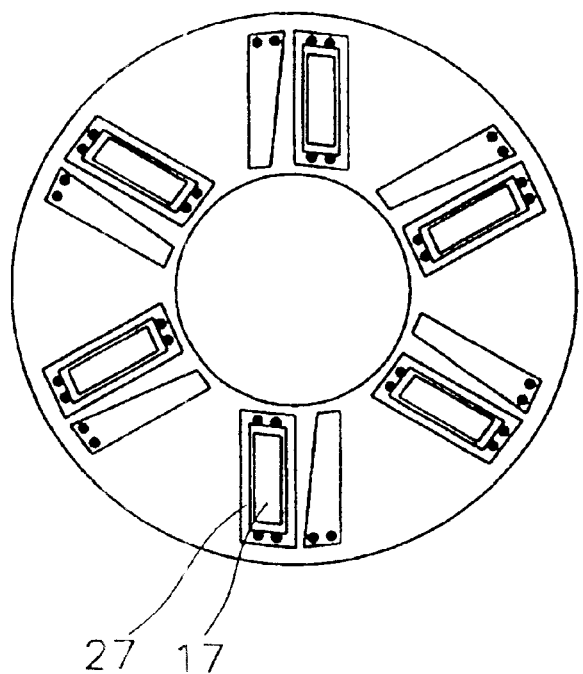
FIG. 9 is a plan view showing the connection of the bent springs of FIG. 7.
Figure 10:
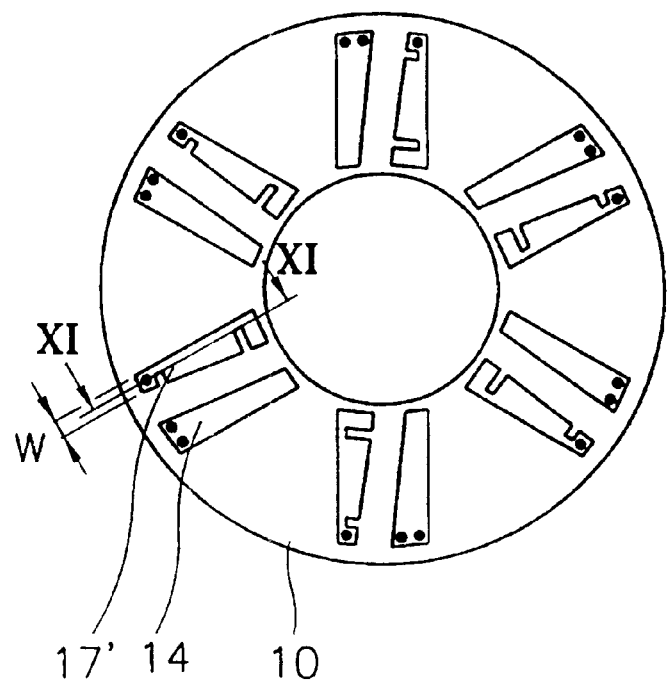
FIG. 10 is a plan view showing another example of the bent springs.
Figure 11:
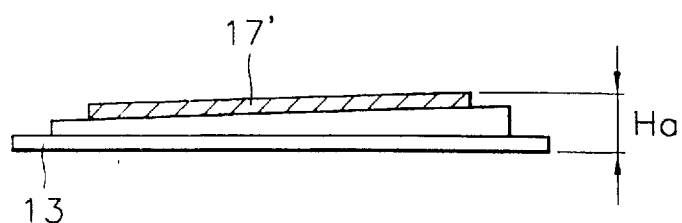
FIG. 11 is a sectional view taken along line XI—XI in FIG. 10.

Alternatively, as shown in FIGS. 7 and 9, a positioning plate 27 having a groove formed having a predetermined depth is welded to the plate 13 and the bent spring 17 loosely rests on the groove of the positioning plate 27. Here, the groove has enough clearance for the elastic deformation of the bent spring 17. This type of structure ensures self-installation of the bent spring 17 to the plate 13 and the elastic foil 15 prevents the bent spring 17 from falling out from the positioning plate 27.

Preferably, the arc height Ha of the bent spring 17 increases from the internal radius of the plate 13 to the external one, while the width W thereof decreases from the internal radius of the plate 13 to the external one.

Also, a thrust disk 11 connected with a rotor, for example, a rotational axis, is placed on the elastic foil 15.

Figure 8:
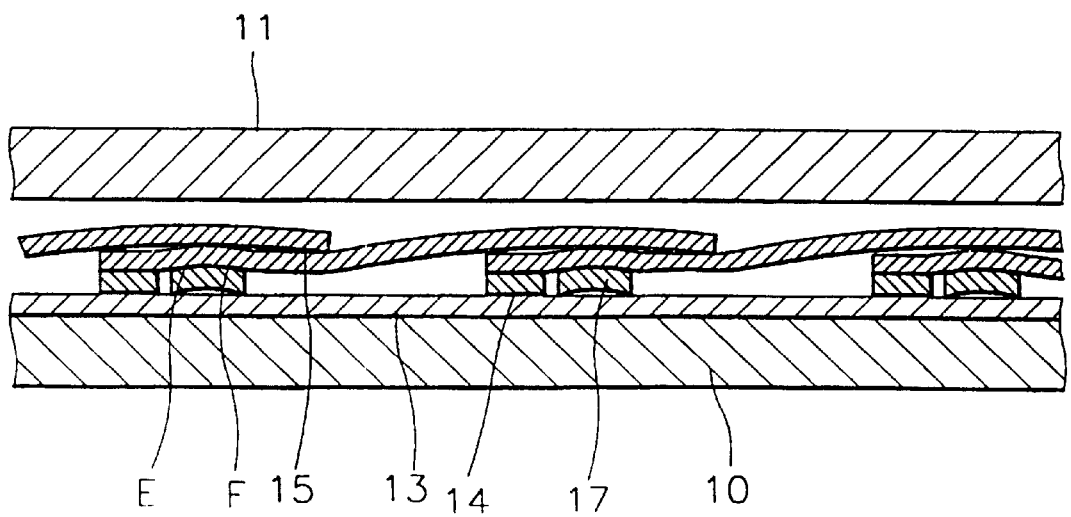
FIG. 8 is a sectional view showing a state of the thrust gas dynamic foil bearing at a normal lift-off speed in the present invention.

In the operation of the thrust gas dynamic foil bearing according to the embodiment of the present invention, when the rotor and the thrust disk 11 rotate in a direction indicated by the arrow of FIG. 4, the thrust disk 11 entrains gas into "a contraction zone", i.e., the area between the thrust disk 11 and the elastic foils 15. The gas pressure in the contraction zone increases rapidly, thereby separating the thrust disk 11 from the elastic foils 15 as shown in FIG. 8.

Figure 1:
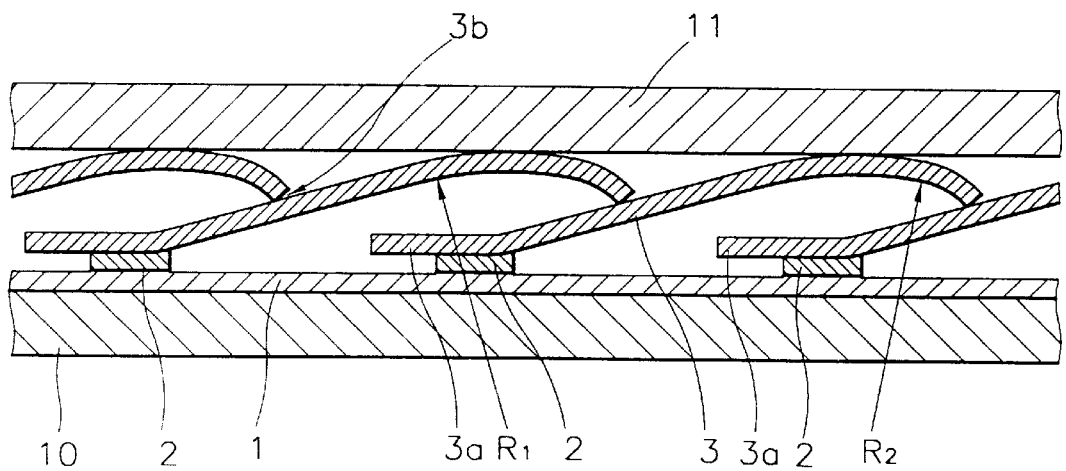
FIGS. 1 and 2 are sectional views of a conventional thrust gas foil bearing.
Figure 2:
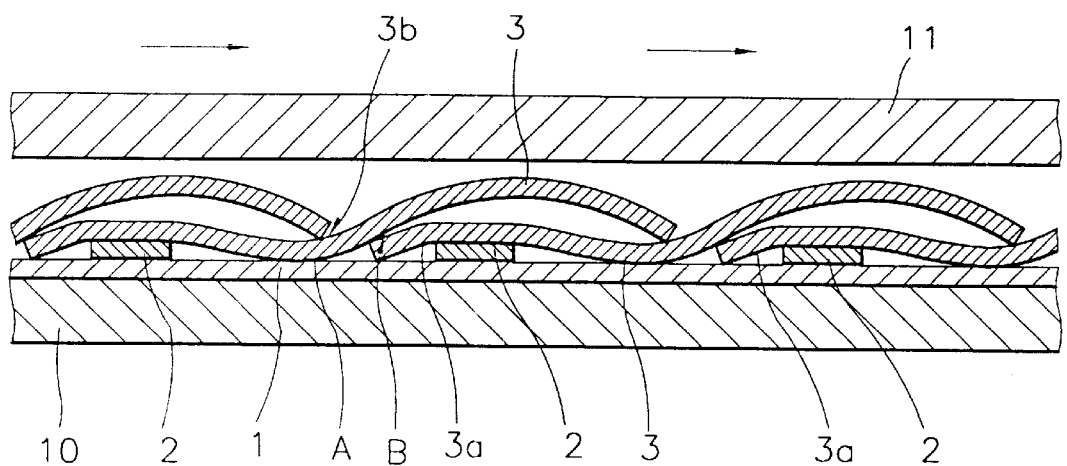

The load characteristics of the thrust gas dynamic foil bearing according to the operation will be now described in detail with reference to FIG. 12 where the variation of height H of the thrust disk 11 (see FIG. 4) from the plate 13 depending on the load F acting on the thrust disk 11 is shown. Here, a curve I is for the thrust gas dynamic foil bearing of the present invention and a curve II is for the conventional bearing shown in FIGS. 1 and 2.

When a relatively small load less than load F1, for example, a load applied during initial operation of the bearing, acts on the thrust disk 11, the thrust disk height H abruptly varies from H0 to H1, wherein H1 is determined by the expression $$H1 \approx H_{min} + H_{sp}. \tag{1}$$

$$H_{min} = 2\delta_r + \delta_{sp}. \tag{2}$$

Here, Hsp is the height of the bent spring arc, Hmin is minimum distance between the thrust disk 11 and the plate 13, $\delta_r$ is the elastic foil's thickness, and $\delta_{sp}$ is the bent spring's thickness. That is, the thrust disk 11 contacts the elastic foil 15 in "a contact zone" being between point C (see FIG. 4) and point D, and a profile of the curve during the initial operation is determined by the rigidity of the elastic foils 15. At this time, deformation of the bent spring 17 is negligible due to its high rigidity.

The bent spring 17 starts deforming when the thrust disk height H further decreases. Then, the rigidity of the elastic foil package begins to be determined by the rigidity of the bent spring 17 and abruptly increases. In the case of the thrust disk height H decreasing below H1, the sustainable load by the thrust disk 11 quickly increases from F1.

In a turbomechanism, a two-side thrust bearing is usually used. Here, to decrease the axial displacement the thrust bearing is assembled with the elastic foils 15 somewhat deformed by being compressed by a preliminary axial load. According to the present invention, when H>H1 a small change in load F results in a large variation in the thrust disk height H, thereby reducing the preliminary axial load compared to the conventional bearing representing the curve II. Specifically, provided that the preliminary assembly height of the thrust disk is Hp, a load $F_1$ is required for the curve I (the present invention) and a load $F_{11}$ higher than $F_1$ is required for the curve II (the conventional bearing). Accordingly, the separation of the thrust disk from the elastic foil for the curve II requires a load higher than that for the curve I, which results in a substantial increase in the lift-off rotation speed of the thrust disk. The increase in the lift-off speed generates friction loss between the elastic foil 15 and the thrust disk 11, thereby reducing the service life-time. i.e., the rotor's start-stop number. Thus, since the lift-off rotation speed of the gas dynamic foil bearing of the present invention is relatively low, the bearing can be applied to non-high speed rotors and the lifespan increases.

Also, since the thrust disk 11 contacts the elastic foil 15 through the rather large zone of the length in the contact zone being between points C and D and having a relatively small initial curvature, the contact stresses caused by the thrust disk 11 onto the elastic foil 15 decrease. This substantially increases the turbomechanism lifespan.

Figure 12:
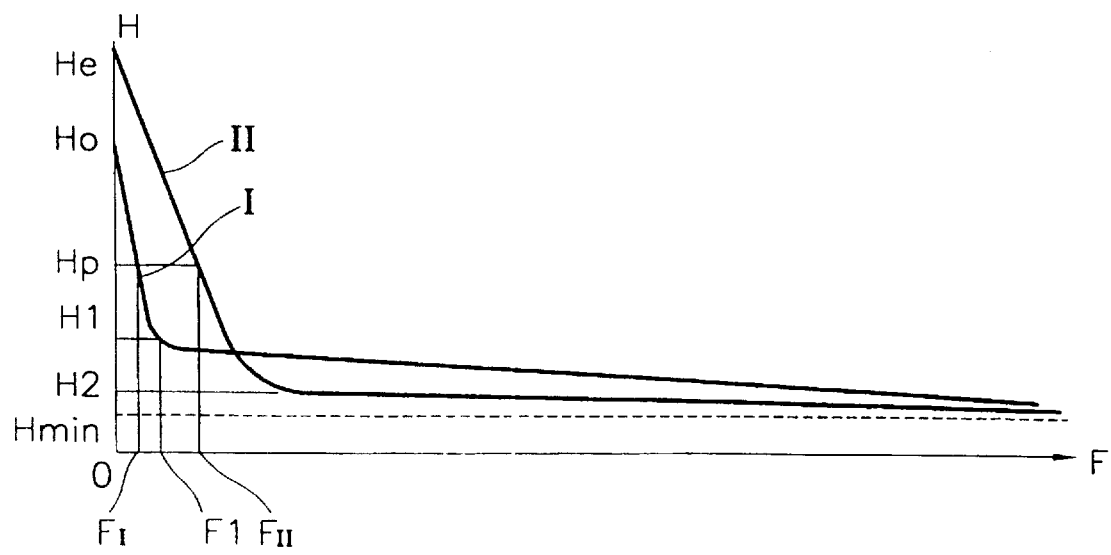
FIG. 12 is a graph showing the change in thrust disk height H depending on an axial load F in the thrust gas dynamic foil bearing.

As shown in FIG. 12, the thrust disk height H of the present invention varies from H0 to H1, while the thrust disk height of the conventional bearing varies from He to H2. Accordingly, displacement of the thrust disk decreases in the present invention.

In the case that H<H1, the bearing load capacity and the damping capacity are improved due to the high rigidity of the bent spring 17. In this zone, the shape of the bent spring 17 changes from an arc into a rectilinear type as shown in FIG. 8. Here, the ends of the bent spring 17 maintain the arc shape and the rectilinear portion appears in the middle between the elastic foil's contact points E and F, the length of which grows with increasing load.

Also, the elastic foils 15 are supported by the bent spring to be kept nearly flat at the normal lift-off speed. As it is known from the gas lubrication theory, the maximal load capacity of the lubricating layer takes place at the taper input portion of the lubrication layer profile and the flat portion. Thus, the bearing load capacity increases.

Figure 13:
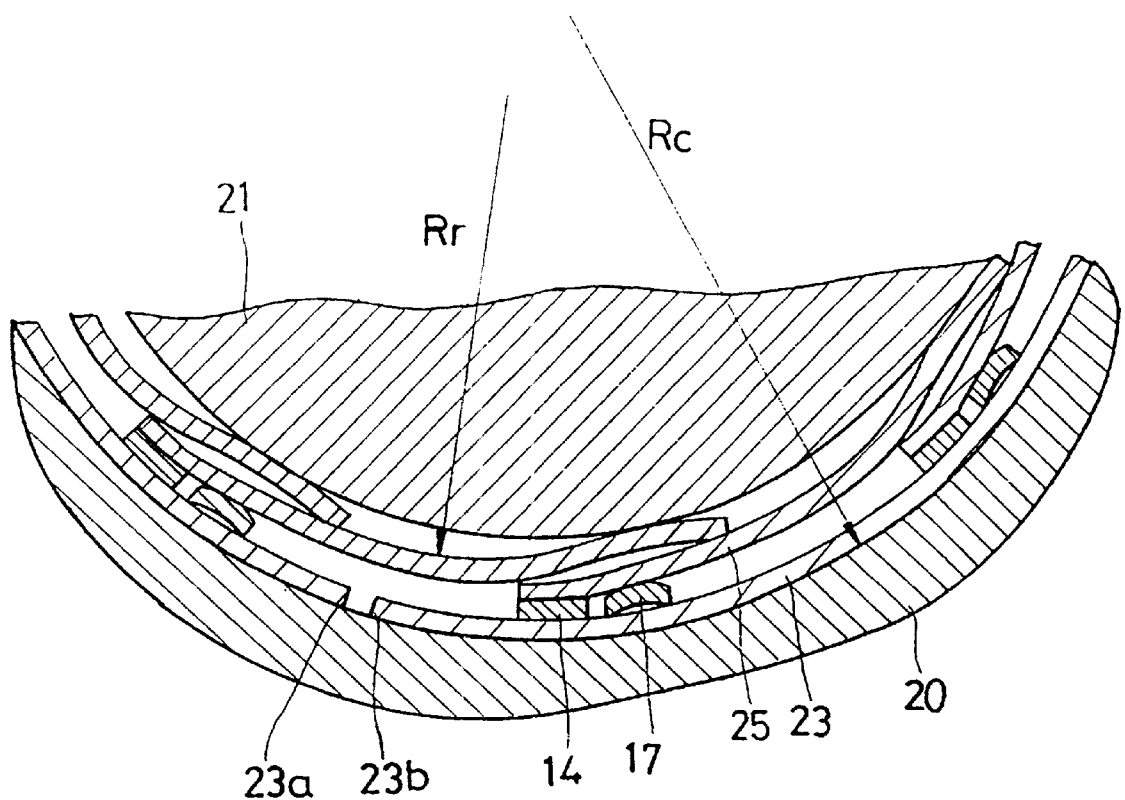
FIG. 13 is a planar sectional view of a radial gas dynamic foil bearing according to another embodiment of the present invention.

A preferred embodiment of a radial gas dynamic foil bearing according to the present invention is shown in FIG. 13, wherein the same reference numerals indicate the same elements of the previous drawings. Referring to the drawing, a plurality of plates 23 in the form of strips having a curvature equal to the inner radius Rc of a base 20 are attached to a inner circumferential surface of the base 20. There is a small gap between the edges 23a and 23b of the plate 23. The connection between an elastic foil 25 and the plate 23 is performed in the same manner as mentioned above.

The elastic foil 25 of the present embodiment has an assembly curvature Rr in an assembled state. The assembly curvature Rr can be obtained by the following equation before installing the elastic foils 25 to a rotation axis 21.

$$1/Rr = 1/Rt + 1/Rc \qquad (3)$$

Here, Rt represents the curvature of the elastic foil as shown in FIG. 3.

The operation and effect described for the thrust gas dynamic foil bearing can also be applied to the radial bearing of the present embodiment.

INDUSTRIAL APPLICABILITY

As described above, the gas dynamic foil bearing has the advantages of decreasing the maximum axial displacement and improving the bearing load capacity. Further, the elastic foil has the same curvature through its entire length, thereby simplifying the manufacture thereof and improving the stability of the bearing's properties.

What is claimed is:

1. A gas dynamic foil bearing comprising:
   a plate attached to a base;
   support members fixed on the plate at predetermined intervals;
   elastic foils fixed to the support members at one end thereof such that the foils overlap each other;
   a thrust disk connected to a rotatable rotor and placed on the elastic foils; and
   at least one bent spring interposed between each of the elastic foils and the plate in the overlapping area of the elastic foils for supporting the elastic foils.

2. The gas dynamic foil bearing according to claim 1, wherein each of the elastic foils has the same curvature through its entire length.

3. The gas dynamic foil bearing according to claim 1, wherein the bent spring is connected to the plate by welding edges thereof to the plate.

4. The gas dynamic foil bearing according to claim 1, wherein the bent spring is comprised of a working portion which supports the elastic foil and is elastically deformable, and coupling portions, on at least one side of the working portion, connected to the plate at a position off a bearing operating zone between an internal radius and an external radius of the elastic foil.

5. The gas dynamic foil bearing according to claim 1, wherein the bent spring loosely rests on a groove formed in a positioning plate connected to the plate and is prevented from falling out of the groove by the elastic foils.

6. The gas dynamic foil bearing according to claim 1, wherein an arc height of the bent spring increases from an internal radius of the plate to an external radius of the plate, while the width of the spring decreases from the internal radius of the plate to the external radius of the plate.

7. A gas dynamic foil bearing comprising:
   a plate attached to an inner circumferential surface of a base;
   support members fixed on the plate at predetermined intervals;
   elastic foils fixed to the support members at one end thereof such that the foils overlap each other;
   a rotation axis contacting the elastic foils; and
   at least one bent spring interposed between the elastic foils and the plate in the overlapping area of the elastic foils for supporting the elastic foils.

8. The gas dynamic foil bearing according to claim 7, wherein the plate includes a plurality of strips having a curvature corresponding to an inner radius of the base.

9. The gas dynamic foil bearing according to claim 7, wherein a gap is formed between edges of the strips of the plate.

10. The gas dynamic foil bearing according to claim 7, wherein a curvature Rr of the foils in an assembled state is represented by the following equation, $$1/Rr = 1/Rt + 1/Rc$$

wherein, Rt is a curvature of the elastic foil and Rc is an inner radius of the base.

11. The gas dynamic foil bearing according to claim 7, wherein the bent spring is connected to the plate by welding edges thereof with the plate.

12. The gas dynamic foil bearing according to claim 7, wherein the bent spring is comprised of a working portion which supports the elastic foil and is elastically deformed, and coupling portions, on at least one side of the working portion, connected to the plate at a position off a bearing operating zone.

13. The gas dynamic foil bearing according to claim 7, wherein the bent spring loosely rests on a groove formed in a positioning plate connected to the plate and is prevented from falling out of the groove by the elastic foil.

* * * * *